(12) United States Patent
Schneider et al.

(10) Patent No.: US 9,281,768 B2
(45) Date of Patent: Mar. 8, 2016

(54) METHOD AND DEVICE FOR SYNCHRONIZING A ROTATION SPEED OF A ROTOR WITH A ROTATION FIELD OF A STATOR

(71) Applicant: Robert Bosch GmbH, Stuttgart (DE)

(72) Inventors: Matthias Schneider, Korntal-Muenchingen (DE); Tibor Takacs, Veszprem (HU); Andras Mersich, Koeszeg (HU)

(73) Assignee: Robert Bosch GmbH, Stuttgart (DE)

( * ) Notice: Subject to any disclaimer, the term of this patent is extended or adjusted under 35 U.S.C. 154(b) by 158 days.

(21) Appl. No.: 14/104,495

(22) Filed: Dec. 12, 2013

(65) Prior Publication Data
US 2014/0167664 A1   Jun. 19, 2014

(30) Foreign Application Priority Data
Dec. 19, 2012   (DE) .......................... 10 2012 223 847

(51) Int. Cl.
 H02P 6/06    (2006.01)
 H02P 6/20    (2006.01)
 H02P 1/46    (2006.01)
 H02P 6/18    (2006.01)

(52) U.S. Cl.
CPC .. *H02P 6/20* (2013.01); *H02P 1/46* (2013.01); *H02P 6/182* (2013.01)

(58) Field of Classification Search
CPC ................. H02M 2001/0058; H02M 3/33507; H02P 23/0068; H02P 6/165
See application file for complete search history.

(56) References Cited

U.S. PATENT DOCUMENTS

2005/0147194 A1 *   7/2005   Koenenkamp ................ 375/348

FOREIGN PATENT DOCUMENTS

DE         102 21 385 A1    11/2003

* cited by examiner

*Primary Examiner* — Karen Masih
(74) *Attorney, Agent, or Firm* — Maginot, Moore & Beck LLP

(57) ABSTRACT

A method for synchronizing a rotation speed of a permanently excited rotor of an electric motor with a frequency of a rotation field of a sensorless commutated stator of the electric motor during a run-up procedure of the electric motor includes determining a phase position of the rotation field and a phase position of a countervoltage that is induced by the rotor in the stator in order to obtain a phase offset between the rotation field and the countervoltage. The method further includes adjusting a prevailing amplitude of one component of the rotation field using the phase offset to synchronize the rotation speed with the frequency. The amplitude of the component is increased if the rotor is lagging behind the rotation field or the amplitude of the component is reduced if the rotor is running ahead of the rotation field.

9 Claims, 3 Drawing Sheets

METHOD AND DEVICE FOR SYNCHRONIZING A ROTATION SPEED OF A ROTOR WITH A ROTATION FIELD OF A STATOR

This application claims priority under 35 U.S.C. §119 to patent application no. DE 10 2012 223 847.6, filed on Dec. 19, 2012 in Germany, the disclosure of which is incorporated herein by reference in its entirety.

BACKGROUND

The present disclosure relates to a method for synchronizing a rotation speed of a rotor of an electric motor with a rotation field of a stator of the electric motor; the present disclosure further relates to a corresponding device and to a corresponding computer program product.

In the case of a sensorless commutated DC motor, an angle position of the rotor can only be determined if a sufficiently high magnitude of countervoltage is induced into the coils of the stator by the magnetic field of the rotor on the basis of a rotation of the rotor.

DE 102 21 385 A 1 describes a method for starting a brushless DC motor.

SUMMARY

On the basis of this background, the present disclosure provides a method for synchronizing a rotation speed of a permanently excited rotor of an electric motor with a rotation field of a sensorless commutated stator of the electric motor during a run-up or start-up procedure of the electric motor; the present disclosure further provides a device for synchronizing a rotation speed of a permanently excited rotor of an electric motor with a rotation field of a sensorless commutated stator of the electric motor during a run-up or start-up procedure of the electric motor and finally the present disclosure provides a corresponding computer program product in accordance with the dependent claims. Advantageous embodiments are evident from the respective dependent claims and the description hereinunder.

In order to effectively commutate a brushless DC motor, it is necessary to have position information regarding a magnetic field alignment of the rotor. It is not possible to determine sufficiently accurate position information in the case of a sensorless DC motor if the rotation speed is below a threshold rotation speed. If the DC motor is started up, then the start-up procedure can take place blind up to the point where a threshold rotation speed is achieved and under the assumption that the rotor is accelerated by a rotation field of the stator coils up to the point where the threshold rotation speed is achieved. If the rotor rotates at a higher rate than the threshold rotation speed, the position information can be determined from a back-induced countervoltage in the stator.

If it is possible to determine the position information, it is possible to determine an angle difference between the magnetic field alignment of the rotor and an angle alignment of the rotation field, which is generated by the commutating process, and/or of a component such as by way of example a magnetic field in a particular direction of the stator. If the angle difference is positive, in other words the angle of the rotor magnetic field is greater in the rotation direction than the angle of the rotation field and/or of its magnetic field lines, the rotation of the rotation field can be reduced or decelerated in order to reduce the angle difference. If the angle difference is positive, in other words the angle of the rotor magnetic field is smaller in the rotation direction than the angle of the rotation field and/or its magnetic field lines, the rotation of the rotation field can be increased or accelerated in order to reduce the angle difference.

It is possible to achieve a continuous force flow by virtue of the continuous transition between a start-up of the rotor for example from standstill and a synchronized run-up to a desired rotation speed. If a load torque on the rotor fluctuates during the run-up process, the fluctuations can be compensated for by virtue of the synchronizing process.

The disclosure provides a method for synchronizing a rotation speed of a permanently excited rotor of an electric motor with a frequency of a rotation field of a sensorless commutated stator of the electric motor during a run-up or start-up procedure of the electric motor, wherein the method comprises the following steps:

determining a phase position of the rotation field and a phase position of a countervoltage that is induced by the rotor in the stator in order to provide a phase offset between the rotation field and the countervoltage; and adjusting a prevailing amplitude at least of one component of the rotation field using the phase offset in order to synchronize the rotation speed with the frequency, wherein the amplitude of the component is increased if the rotor is lagging behind the rotation field or the amplitude of the component is reduced if the rotor is running ahead of the rotation field.

A rotor can be a rotatable component of an electric machine. A stator can be a rotatably fixed component of the electric machine. The term "rotation speed of the rotor" can be understood to refer to a number of complete rotations of the rotor per unit of time relative to the stator. The rotor can comprise at least one permanent magnet that is fixedly connected to the rotor and is designed so as to generate a constant magnetic field that can rotate with the rotor. By way of example, the rotor can be embodied in the shape of a bell and can comprise a permanent magnetic ring on a periphery. The rotor can be embodied in a single pole or multi pole manner. The stator can comprise at least two electric coils for generating a variable magnetic field of a rotation field, which magnetic field can rotate relative to the stator. The stator can be embodied in a single pole or multi pole manner. The rotation field can comprise components such as for example magnetic fields, magnetic fluxes and/or magnetic field lines that change their direction or orientation with a particular frequency. The frequency represents a number of revolutions of the magnetic field lines as components of the rotation field per unit of time relative to the stator. The stator can by way of example be arranged inside the bell of the rotor. The stator can be embodied in a sensorless manner. The electric coils can be connected to a controllable device unit for generating variable electric voltages and/or variable electric current flows. By way of example, the stator can comprise three electric coils that are arranged at an angle of 120° with respect to one another and can be switched independently from one another. The electric motor can be a brushless DC motor. Current can flow through the coils in a DC motor in a predetermined sequence in order to generate the rotation field. Current can also flow through two of the coils simultaneously. The term "commutating process" can be understood to refer to switching over the coils in sequence. The rotation of the rotation field can be generated by virtue of the switching over process. A run-up procedure or a start-up procedure can be a procedure in which the rotor is accelerated from standstill up to a target rotation speed or a desired rotation speed. A phase position can be an angle of a magnetic field of the rotation field or of the magnetic field relative to the stator and/or to a winding of the stator. A countervoltage can be an electric voltage that is induced into the coils of the stator as a result of a rotation of the rotor and the permanent magnetic field of the rotor. The countervoltage can counteract the voltage and/or the current for generating the rotation field. The countervoltage can comprise a sinewave shaped progression in an individual coil of the stator. The countervoltage can be generated synchronously with the magnetic field of the rotor. The countervoltage can increase in proportion to the rotation speed of the rotor. The phase position of the rotation field can be displaced relative to the phase position of the countervoltage. A phase offset can be an angle difference between the phase position of the rotation field and the phase position of the countervoltage. An amplitude of a component of the rotation field can be a magnitude of the magnetic field that is generated by the coils. In the case of a greater amplitude of a component of the rotation field, a greater magnitude of torque can be transmitted to the rotor. As current flows through the coils in the stator, the current in the coil can be superimposed over the countervoltage in the coil and as a result it is almost impossible to determine the countervoltage.

The disclosure further provides a device for synchronizing a rotation speed of a permanently excited rotor of an electric motor with a frequency of a rotation field of a sensorless commutated stator of the electric motor during a run-up or start-up procedure of an electric motor, wherein the device comprises the following features:

a device unit for the determining step, which device unit is designed so as to determine a phase position of the rotation field and a phase position of a countervoltage that is induced by the rotor in the stator and is designed so as to provide a phase offset between the rotation field and the countervoltage; and a device unit for the adjusting step, which device unit is designed so as to adjust a prevailing amplitude at least of one component of the rotation field using the phase offset in order to synchronize the rotation speed with the frequency, wherein the amplitude of the component is increased if the rotor is lagging behind the rotation field or the amplitude of the component is reduced if the rotor is running ahead of the rotation field.

The object of the disclosure can also be achieved in a rapid and efficient manner by means of this embodiment of the disclosure in the form of a device.

The term "device" in this case can be understood to refer to an electrical device that processes sensor signals and in dependence thereon outputs control signals and/or data signals. The device can comprise an interface or can be embodied in the form of hardware and/or software. In the case of a hardware embodiment, the interfaces can be by way of example part of a so-called ASIC system that includes the most varied functions of the device. However, it is also possible that the interfaces are dedicated integrated switching circuits or that they comprise at least in part discrete components. In the case of a software embodiment, the interfaces can be software modules that are provided by way of example on a microcontroller in addition to other software modules.

The amplitude of the component of the rotation field can be changed, in that a prevailing current flow through coils of the stator generating the rotation field is changed, wherein the current flow is increased if the rotor is lagging behind the rotation field or the current flow is reduced if the rotor is running ahead of the rotation field. The amplitude of the component of the rotation field can be proportional to the current flow. If the current flow is enlarged or increased, the component of the rotation field can be greater. If the current flow is decreased or reduced, the component of the rotation field can be smaller.

The current flow can be changed in that a prevailing duty cycle of a pulse width modulation process is changed, wherein the duty cycle is increased if the rotor is lagging behind the rotation field or the duty cycle is reduced if the rotor is running ahead of the rotation field. Pulse width modulation can render possible different values of a current flow by means of adjusting a switching period of a switch having two switching positions. A maximal current flow can be achieved in each case during the switching period, however, it is not possible in each case for the current to flow outside the switching period, wherein an average value of the current flow results as an effective current flow following an optional smoothing of the current flow.

The amplitude of the component of the rotation field can be controlled using a desired rotation speed of the rotor and the rotation speed of the rotor if the phase offset is smaller than a limit value, wherein the amplitude of the component of the rotation field is increased if the rotation speed is smaller than the desired rotation speed or the amplitude of the component of the rotation field is reduced if the rotation speed is greater than the desired rotation speed. The rotation speed can be controlled in a control circuit. The returned control variable can be the rotation speed. The control circuit can comprise the desired rotation speed as a reference variable. The actuating variable can be the amplitude of the component. The actuating variable can be determined using a proportional factor and/or an integral factor and/or a differential factor arising from a control deviation.

The phase position of the rotation field and alternatively or in addition thereto the phase position of the countervoltage can be determined if an amplitude of the countervoltage is greater than a minimum amplitude. The phase position can be reliably determined if the amplitude of the countervoltage is greater than a minimum amplitude. In order to reduce the outlay with respect to the control procedure, the phase position of the rotation field can only be determined if the amplitude of the countervoltage is greater than the minimum amplitude.

The method can comprise a step of determining the rotation field, which step is performed in response to a start-up signal, wherein the frequency of the rotation field is increased by using a predetermined ramp function. A ramp function can represent a constant increase of the frequency. It is possible by means of a ramp function to start-up the motor without determining the prevailing rotation speed of the rotor, since an incline of the ramp can be designed in such a manner that the rotor despite its mass inertia can follow the acceleration as a result of the rotation field that is being set in rotation. The run-up or start-up procedure of the rotor can only be controlled if the countervoltage can be determined.

An amplitude of the countervoltage can be determined and the amplitude of the component of the rotation field can be changed using the amplitude of the countervoltage. In order to avoid high start-up currents in the coils of the stator, the amplitude of the component of the rotation field can be increased in relation to the amplitude of the countervoltage. As a consequence, it is possible to limit the maximum amount of torque that can be transmitted by the electric motor.

Also of advantage is a computer program product having program code that can be stored on a machine-readable media such as a semiconductor storage device, a hard drive or an optical storage device and that can be used to perform the method according to any one of the previously described embodiments if the program product is implemented on a computer or on a device.

BRIEF DESCRIPTION OF THE DRAWINGS

The disclosure is further explained by way of example hereinunder with reference to the attached drawings, in which.

DETAILED DESCRIPTION

Figure 1:
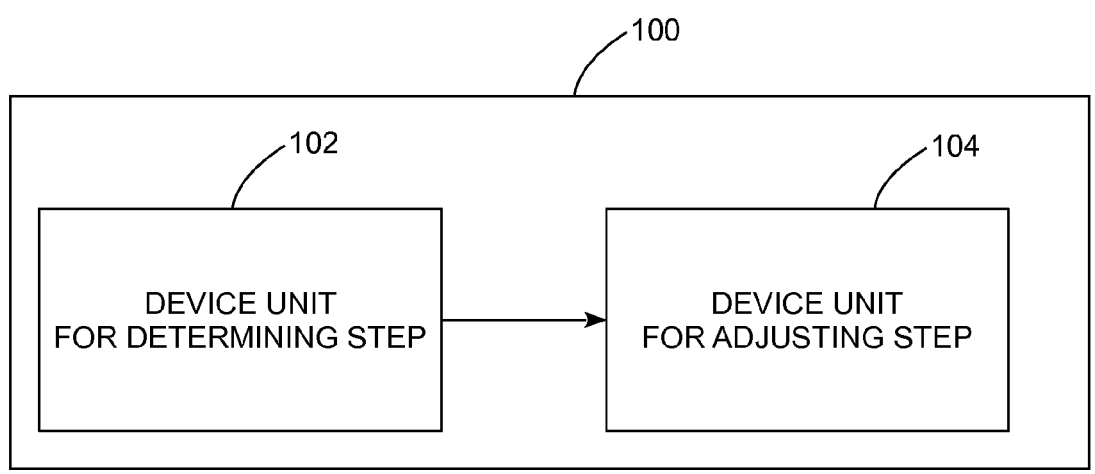
FIG. 1 illustrates a block diagram of a device for synchronizing a rotation speed of a rotor of an electric motor with a rotation field of a stator of the electric motor in accordance with an exemplary embodiment of the present disclosure.

Like or similar reference numerals are used in the description hereinunder of preferred exemplary embodiments of the present disclosure for the elements that are illustrated in the different figures and function in a similar manner and a description of these elements is not repeated.

FIG. 1 illustrates a block diagram of a device 100 for synchronizing a rotation speed of a permanently excited rotor of an electric motor with a rotation field and/or a frequency of a sensorless commutated stator of the electric motor during a run-up or start-up procedure of the electric motor in accordance with an exemplary embodiment of the present disclosure. The device 100 comprises a device unit 102 for the determining step and a device unit 104 for the adjusting step. The device unit 102 for the determining step is designed so as to determine a phase position of the rotation field and a phase position of a countervoltage that is induced by the rotor in the stator. Moreover, the device unit 102 for the determining step is designed so as to provide a phase offset between the rotation field and the countervoltage. The device unit 104 for the adjusting step is designed so as to adjust a prevailing amplitude of a component of the rotation field using the phase offset in order to synchronize the rotation speed with the rotation field and/or the frequency, wherein the amplitude is increased if the rotor is lagging behind the rotation field or the amplitude is reduced if the rotor is running ahead of the rotation field.

Figure 2:
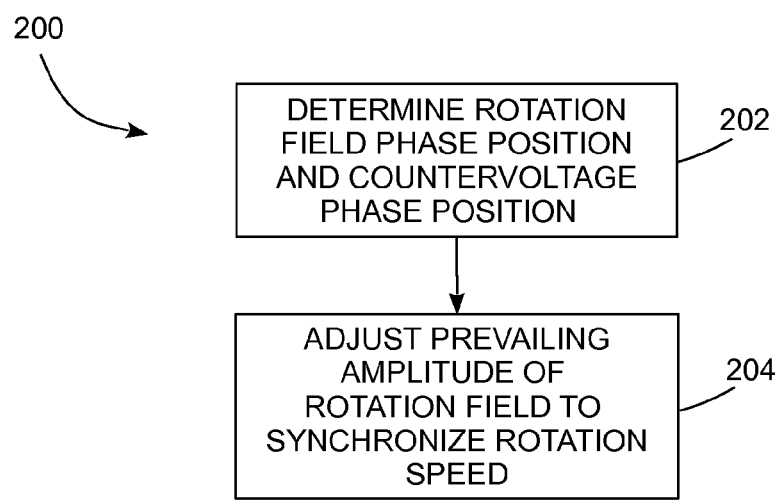
FIG. 2 illustrates a flow chart of a method for synchronizing a rotation speed of a rotor of an electric motor with a rotation field of a stator of the electric motor in accordance with an exemplary embodiment of the present disclosure.

FIG. 2 illustrates a flow chart of a method 200 for synchronizing a rotation speed of a rotor of an electric motor with a rotation field and/or of a frequency of a stator of the electric motor in accordance with an exemplary embodiment of the present disclosure. The method 200 comprises a determining step 202 and an adjusting step 204. The determining step 202 determines a phase position of the rotation field and a phase position of a countervoltage that is induced by the rotor in the stator in order to achieve a phase offset between the rotation field and the countervoltage. The adjusting step 204 adjusts a prevailing amplitude (of the component) of the rotation field using the phase offset in order to synchronize the rotation speed with the rotation field and/or the frequency, wherein the amplitude is increased if the rotor is lagging behind the rotation field or the amplitude is reduced if the rotor is running ahead of the rotation field.

Figure 3:
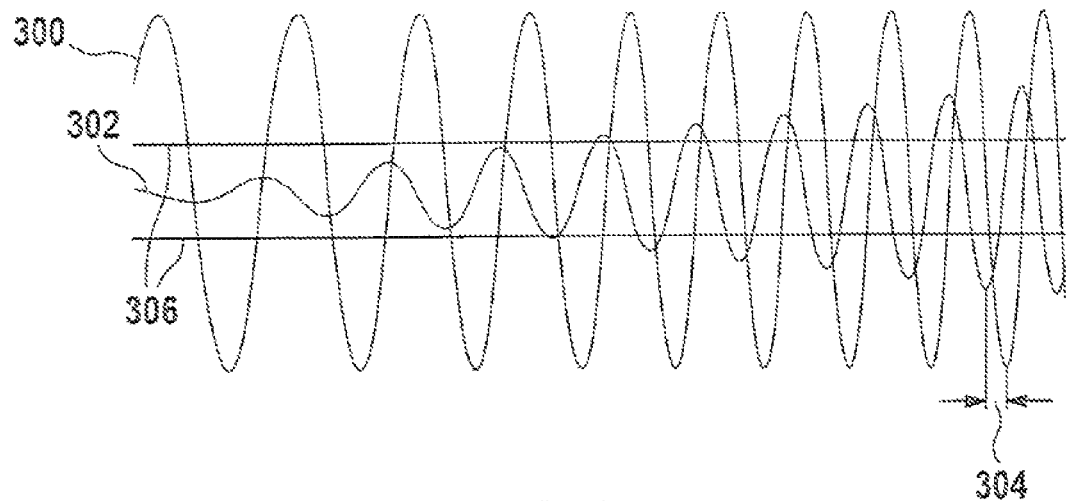
FIG. 3 illustrates a progression of a magnetic flux of a rotation field and a progression of a countervoltage during a start-up procedure of an electric motor.

FIG. 3 illustrates a progression 300 with respect to time of a magnetic flux of a rotation field and a progression 302 of a countervoltage during a start-up procedure of an electric motor. The rotation field 300 and the countervoltage 302 are plotted relative to a stator of the electric motor. Time is plotted continuously on the x-axis. An amplitude is plotted on the y-axis. In the illustrated case, both the rotation field 300 and also the countervoltage 302 comprise a sine-wave shaped progression. A frequency of the rotation field and of the countervoltage increase synchronously. The rotation field 300 comprises a component (such as by way of example a magnetic flux) having a constant amplitude. The amplitude of the countervoltage is proportional to the frequency. The rotation field 300 runs ahead of the countervoltage 302 by a phase offset 304. A threshold value 306 for the countervoltage 302 is plotted in the illustrated progressions 300, 302. The threshold value 306 is plotted in a symmetrical manner with respect to a neutral position, not illustrated, of the amplitude. The countervoltage 302 only achieves the magnitude equal to the threshold value 306 during the fourth oscillation. During the fifth oscillation, the countervoltage 302 is greater than the threshold value 306. By way of example, it is only possible above the threshold value 306 to determine the countervoltage 302 precisely enough in order to determine a phase position of the countervoltage 302. Consequently, after the countervoltage 302 has exceeded the threshold value 306, it is not possible in accordance with the here described method to increase the amplitude of the rotation field 300 in order to reduce the phase offset 304 and/or allow said phase offset to reduce to zero. If the phase offset 304 is smaller than a limit value, then the rotation field 300 and the countervoltage are synchronized.

A BLDC motor is a brushless DC electric motor that comprises a permanent magnet rotor and electrically commutated stator coils. Since the DC electric motor does not comprise any brushes, the magnetic field rotates by means of an electric control and driver circuit arrangement. The rotor follows this rotating magnetic field in dependence upon the mechanical loading.

The rotating permanent magnets induce a voltage 302 into the stator coils, which voltage is superimposed on the AC voltage 300 for generating the rotation field. These induced voltages 302 are called back electromotive force (back EMF or countervoltage) (BEMF). BEMF signals are proportional to a rotation speed of the rotor.

A BLDC motor is controlled in an optimal manner (minimal current consumption, minimal noise) if the rotating magnetic field, represented in this case by the coil current 300, and the BEMF 302 are synchronized. It is necessary to know the position of the rotor in order to ensure that said motor is controlled in an optimal manner. Thus, the magnetic field 300 can be rotated according to the BEMF 300.

If sensors are not available for the purpose of determining the rotor position, the BEMF 302 can be used for the purpose of estimating the rotor position. It is only possible to estimate said rotor position when the rotation speed is above a defined rotation speed threshold. If the rotation speed is below this limit 306, the BEMF signal 302 is not sufficient for the purpose of estimating the rotor position, wherein the BEMF 306 amplitude is proportional to the rotor rotation speed. Consequently, the magnetic field 300 can be synchronized with the BEMF 302. FIG. 3 illustrates a start-up procedure, wherein the magnetic field 300 and the BEMF 302 are not synchronized. The magnetic field 300 and the BEMF 302 comprise a phase shift 304 during the start-up procedure.

On the basis of the abovementioned threshold value 306, it is necessary to separate the BLDC motor operation into two discrete phases: motor start-up operation and motor normal operation. One of the simplest options for the start-up procedure is a "blind" algorithm that increases the frequency of the magnetic field 300 in steps without taking into consideration the rotor position while the BEMF level 302 is below the threshold value 306. If the threshold value 306 is achieved and the BEMF signals 302 are accessible, it is necessary to synchronize the magnetic field 300 with the position of the rotor prior to switching over to the normal operation. The here described method is concerned with the run-up procedure and especially the algorithm that renders possible a smooth transition from the start-up phase into the normal operation.

If the speed threshold 306 is achieved, the motor can be allowed to run freely by virtue of separating all AC sources that generate a rotation field. The BEMF 302 can then be measured and the magnetic field 300 restored in the correct position. Any load change during the synchronization phase in this solution can cause the motor to stop. During the free-running phase, the rotor continues to rotate only as a result of its inertia. The mechanical pulse is interrupted.

Figure 4:
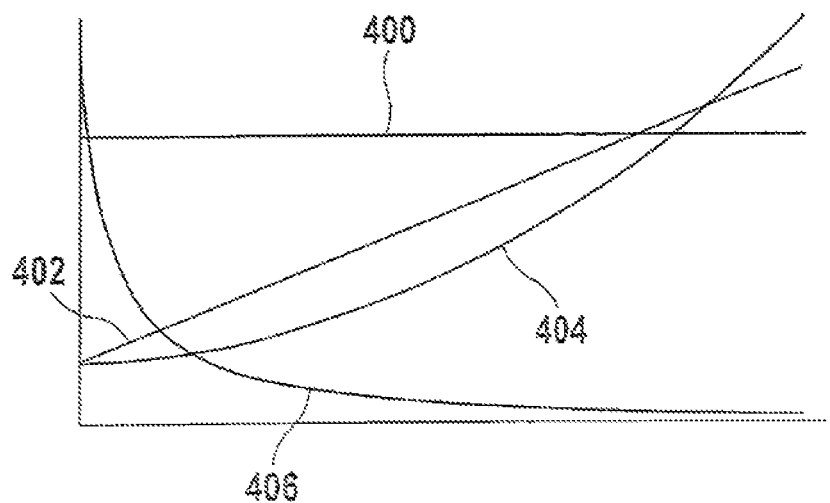
FIG. 4 illustrates torque curves of different electric motors.

FIG. 4 illustrates torque curves 400, 402, 404, 406 of different electric motors. A rotation speed is plotted on the x-axis. The rotation speed commences at zero at the origin. Torque is plotted on the y-axis. The torque starts at zero at the origin. A first electric motor comprises a first torque curve 400. The torque of the first electric motor remains constant with respect to the rotation speed. A second electric motor comprises a second torque curve 402. The torque of the second electric motor increases in a linear manner with respect to the rotation speed. A third electric motor comprises a third torque curve 404. The torque of the third electric motor increases in a quadratic manner with respect to the rotation speed. A fourth electric motor comprises a fourth torque curve 406. The torque of the fourth electric motor reduces inversely proportionally with respect to the rotation speed.

FIG. 4 illustrates torques of different motor types with by way of example a constant torque 400, a torque 402 that is increasing in a linear manner with respect to the rotation speed, a torque 404 that is increasing in a quadratic manner with respect to the rotation speed and a torque 406 that is inversely reducing in a proportional manner with respect to the rotation speed.

If the torque is constant, the run-up can be configured in such a manner that as the limit rotation speed is achieved, the magnetic field and the BEMF are already synchronized. This method requires a constant torque, as is the case for example in the case of a crane or a lift motor. Different mechanical load profiles 400, 402, 404, 406 are illustrated in FIG. 4.

Figure 5:
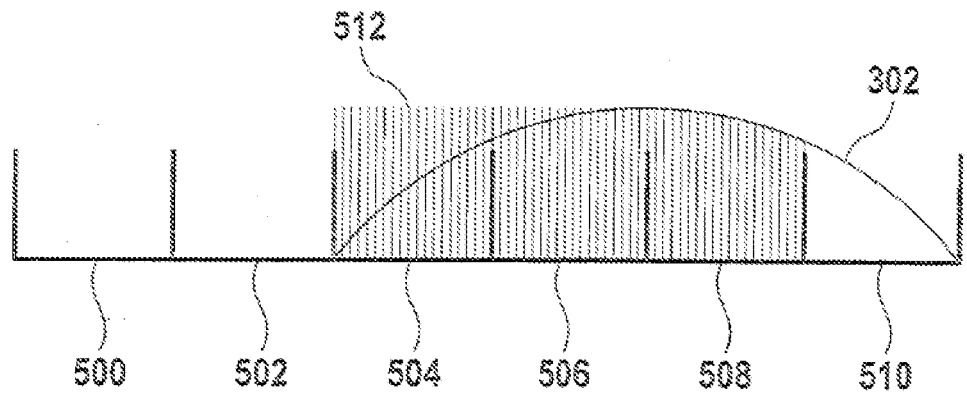
FIG. 5 illustrates a countervoltage that is running ahead with a shift pattern for an electric motor in accordance with an exemplary embodiment of the present disclosure.

FIG. 5 illustrates a countervoltage 302 that is running ahead with a shift pattern for an electric motor in accordance with an exemplary embodiment of the present disclosure. The figure illustrates a voltage level on an individual motor phase, wherein the voltage level is the cause of a current flow during a rotation of the electric motor. The voltage level is adjusted using a six-step block commutation process. In the case of a six-step block commutation process, the rotation is adjusted in six equal sized angle steps 500, 502, 504, 506, 508, 510. In the example illustrated here, the phase is actively controlled using pulse width modulation during the third step 504 and the fourth step 506. A constant high current 512 flows through the motor phase in the third step 504 and the fourth step 506. It is not possible to determine the countervoltage 302 during the third step 504 and the fourth step 506. The countervoltage 302 is sensed in the third step 502 and the fifth step 508. The superimposed BEMF (countervoltage) signal 302 is displaced relative to the excitation signal 512 towards the right in the direction of the sixth step 510. A phase position of the countervoltage 302 can be determined on the basis of this sensing process. In the illustrated example, the rotor of the electric motor is running ahead of the rotation field, which is the reason why the countervoltage 302 is only determined in the fifth step 508. The countervoltage 302 reduces in the fifth step 508 in a sine-wave shaped manner. In order to synchronize the rotation field with the rotor, the phase positions of the motor phase and of the countervoltage 302 are determined according to the here described method in order to determine a phase offset. Since the rotor is running ahead of the rotation field, a current magnitude of the current 512 is thereupon reduced in the third step 504 and in the fourth step 506. The reduced current magnitude causes a reduced magnetic field in the stator and a reduced force is exerted on the rotor, as a consequence of which the rotor is slightly decelerated and the phase offset becomes smaller.

Figure 6:
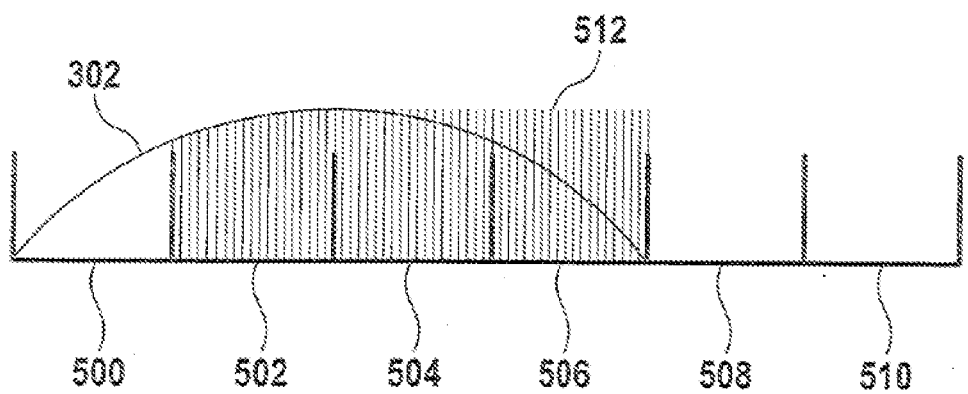
FIG. 6 illustrates a countervoltage that is lagging behind with a shift pattern for an electric motor in accordance with an exemplary embodiment of the present disclosure.

FIG. 6 illustrates a countervoltage 302 that is lagging behind with a shift pattern for an electric motor in accordance with an exemplary embodiment of the present disclosure. The illustration corresponds to the illustration in FIG. 5. In contrast to FIG. 5, the superimposed BEMF signal 302 is displaced relative to the excitation signal 512 towards the left in the direction of the first step 500. As in FIG. 5, current 512 flows through the motor phase in the third step 504 and in the fourth step 506. The phase is actively controlled using pulse width modulation during the third step 504 and the fourth step 506. In the example illustrated here, the countervoltage 302 increases in the second step 502 in a sine-wave shaped manner, whereas it is not possible to determine the voltage in the fifth step 508. The rotor of the electric motor is therefore lagging behind the rotation field. In order to synchronize the rotation field with the rotor, the phase offset is determined as in FIG. 5. Since the rotor is lagging behind the rotation field, a current magnitude of the current 512 is thereupon increased. The increased current magnitude causes a stronger magnetic field in the stator and a greater force is exerted on the rotor, as a consequence of which the phase offset becomes smaller.

Figure 7:
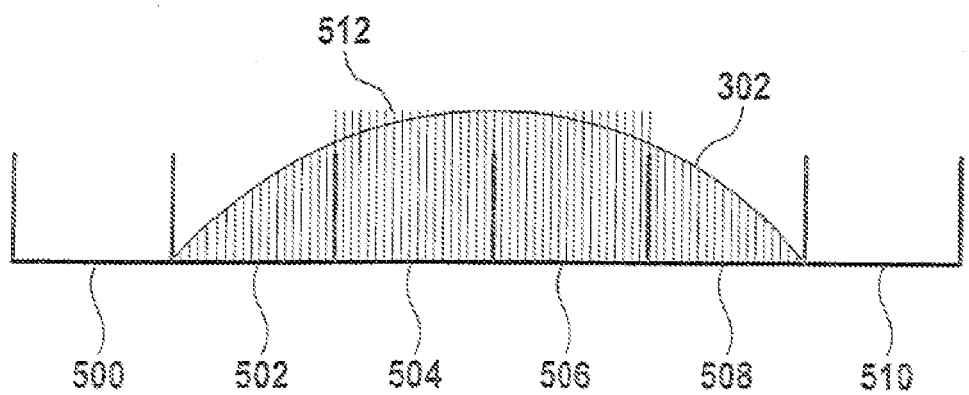
FIG. 7 illustrates a synchronized countervoltage with a shift pattern for an electric motor in accordance with an exemplary embodiment of the present disclosure.

FIG. 7 illustrates a synchronized countervoltage 302 with a shift pattern for an electric motor in accordance with an exemplified embodiment of the present disclosure. The illustration corresponds to the illustration in FIGS. 5 and 6. As in FIGS. 5 and 6, current 512 flows through the motor phase in the third step 504 and in the fourth step 506 and the phase is actively controlled using pulse width modulation during the steps 504 and 506. In the example illustrated here, the superimposed BEMF signal 302 is synchronized correctly relative to the excitation signal 512. The countervoltage 302 increases in a sine-wave shaped manner during the second step 512. The countervoltage 302 reduces in a sine-wave shaped manner in the fifth step 508. The rotor of the electric motor is neither running ahead of the rotation field nor lagging behind the rotation field. The electric motor can now be run up to a desired rotation speed. To this end, the current flow 512 can be increased in the phase on the basis of the accelerating forces during the run-up procedure to the desired rotation speed in order to be able to transmit more torque to the rotor and to prevent a phase offset reoccurring.

In other words, FIGS. 5, 6 and 7 illustrate examples for a synchronization of a countervoltage 302 (BEMF) during the start-up procedure and during the switchover between a controlled start-up procedure and a normal operation for BLDC motors. By way of example, a motor can be used in this manner as a drive for an oil pump and can be controlled in accordance with the here described method. FIGS. 5, 6 and 7 illustrate a final phase of a controlled sensorless run-up procedure for BLDC motors. The rotating magnetic field and the BEMF 302 are synchronized without losing any torque.

If the threshold value is achieved, the direction of the phase shift is recognized. The BEMF 302 either lags behind (as in FIG. 6) or runs ahead (as in FIG. 5) of the magnetic field and the result current 512. If the BEMF 302 is lagging behind (FIG. 6), the amplitude of the magnetic field can be increased. If the BEMF 302 is running ahead (FIG. 5), the amplitude can be reduced. The excitation signal 512 can be a pulse width modulation signal. The amplitude can be adjusted by changing the duty cycle. If the properly synchronized state is achieved (FIG. 7), the run-up procedure can be terminated. A normal control phase having a closed loop can then be switched in and the position information that is already available can be used.

By virtue of the here described method, the motor can be controlled for the whole time, so that the mechanical torque is not interrupted. Load changes during the run-up procedure can be tolerated up to a particular magnitude.

The above-described technique can be used for controlling an electric oil pump that is based on a BLDC motor in an automatic transmission control unit.

In addition, an adaptive run-up procedure or start-up procedure can be performed. The BEMF signal form 302 is checked using the same logic as described above during the start-up phase. The amplitude of the magnetic field is corrected according to the recognized form in order to minimize a start-up current of the electric motor. If the synchronized BEMF 302 is recognized, as in FIG. 7, the closed loop control is switched in immediately. It is possible using the method having an adaptive start-up phase to reduce the start-up current and the run-up procedure is quicker.

The exemplary embodiments described and illustrated in the figures are only selected by way of example. Different exemplary embodiments can be stand alone or can be combined with one another with regard to individual features. One exemplary embodiment can also be supplemented by features of a further exemplary embodiment.

Moreover, method steps in accordance with the disclosure can be repeated and can be performed in a different sequence to the sequence described.

If an exemplary embodiment comprises an "AND/OR" operation between a first feature and a second feature, then this is understood to mean that the exemplary embodiment in accordance with an embodiment comprises both the first feature and also the second feature and in accordance with a further embodiment comprises either only the first feature or only the second feature.

What is claimed is:

1. A method for synchronizing a rotation speed of a permanently excited rotor of an electric motor with a frequency of a rotation field of a sensorless commutated stator of the electric motor during a run-up or start-up procedure of the electric motor, comprising:
   determining a phase position of the rotation field and a phase position of a countervoltage that is induced by the rotor in the stator in order to obtain a phase offset between the rotation field and the countervoltage; and
   adjusting a prevailing amplitude at least of one component of the rotation field using the phase offset in order to synchronize the rotation speed with the frequency,
   wherein the amplitude of the component is increased if the rotor is lagging behind the rotation field or the amplitude of the component is reduced if the rotor is running ahead of the rotation field.

2. The method according to claim 1, wherein:
   in the adjusting step the amplitude of the component of the rotation field is changed in that a prevailing current flow through coils of the stator generating the rotation field is changed, and
   the current flow is increased if the rotor is lagging behind the rotation field or the current flow is reduced if the rotor is running ahead of the rotation field.

3. The method according to claim 2, wherein:
   in the adjusting step the current flow is changed in that a prevailing duty cycle of a pulse width modulation process is changed, and
   the duty cycle is increased if the rotor is lagging behind the rotation field or the duty cycle is reduced if the rotor is running ahead of the rotation field.

4. The method according to claim 1, wherein:
   in the adjusting step the amplitude of the component of the rotation field is controlled using a desired rotation speed of the rotor and the rotation speed of the rotor if the phase offset is smaller than a limit value, and
   the amplitude of the component of the rotation field is increased if the rotation speed is smaller than the desired rotation speed or the amplitude of the component of the rotation speed is reduced if the rotation speed is greater than the desired rotation speed.

5. The method according to claim 1, wherein in the determining step, the phase position of the rotation field and/or the phase position of the countervoltage is determined if an amplitude of the countervoltage is greater than a minimum amplitude.

6. The method according to claim 1, further comprising:
   providing the rotation field in response to a start-up signal, and
   wherein the frequency of the rotation field is increased using a predetermined ramp function.

7. The method according to claim 6, wherein:
   an amplitude of the countervoltage is determined in the providing step, and
   the amplitude of the component of the rotation field is changed in the adjusting step using the amplitude of the countervoltage.

8. The method according to claim 1, wherein a non-transitory computer program product includes a program code configured to perform the method if the computer program product is implemented on a device.

9. A device for synchronizing a rotation speed of a permanently excited rotor of an electric motor with a frequency of a rotation field of a sensorless commutated stator of the electric motor during a run-up or start-up procedure of the electric motor, comprising:
   a first device unit configured to determine a phase position of the rotation field and a phase position of a countervoltage that is induced by the rotor in the stator and is further configured so as to provide a phase offset between the rotation field and the countervoltage; and
   a second device unit configured to adjust a prevailing amplitude at least of one component of the rotation field using the phase offset in order to synchronize the rotation speed with the frequency,
   wherein the second device unit is configured (i) to increase the amplitude of the at least one component if the rotor is lagging behind the rotation field, or (ii) to reduce the amplitude of the at least one component if the rotor is running ahead of the rotation field.

* * * * *